United States Patent
Kim et al.

(10) Patent No.: US 9,334,965 B2
(45) Date of Patent: May 10, 2016

(54) GAS SEAL ASSEMBLY

(71) Applicant: HANWHA TECHWIN CO.,LTD., Changwon (KR)

(72) Inventors: Jin-Hyoung Kim, Changwon (KR); Bong-Gun Shin, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/019,784

(22) Filed: Sep. 6, 2013

(65) Prior Publication Data

US 2014/0145404 A1  May 29, 2014

(30) Foreign Application Priority Data

Nov. 28, 2012 (KR) .......................... 10-2012-0136548

(51) Int. Cl.
  *F16J 15/32* (2006.01)
  *F16J 15/34* (2006.01)
  *F16J 15/38* (2006.01)

(52) U.S. Cl.
  CPC .............. *F16J 15/3452* (2013.01); *F16J 15/38* (2013.01)

(58) Field of Classification Search
  CPC ....... F16J 15/34; F16J 15/3436; F16J 15/344; F16J 15/3452
  USPC ................................. 277/377, 399, 402, 358
  See application file for complete search history.

(56) References Cited

U.S. PATENT DOCUMENTS

| 5,224,714 | A  | * | 7/1993  | Kimura et al. ................. 277/400 |
| 5,421,593 | A  | * | 6/1995  | Aritsubo et al. ............... 277/361 |
| 6,425,583 | B1 | * | 7/2002  | Muraki ......................... 277/358 |
| 6,601,854 | B2 |   | 8/2003  | Auber |
| 7,144,016 | B2 |   | 12/2006 | Gozdawa |
| 2005/0242515 | A1 |   | 11/2005 | Brooks et al. |

FOREIGN PATENT DOCUMENTS

JP  2011231880 A  11/2011

* cited by examiner

*Primary Examiner* — Gilbert Lee
(74) *Attorney, Agent, or Firm* — Sughrue Mion, PLLC

(57) ABSTRACT

Provided is a gas seal assembly which includes: an inner sleeve in which a rotation axle is inserted; a rotational sealing sleeve inserted into the inner sleeve; a sealing sleeve contacting the rotational sealing sleeve; a forcing sleeve forcing the sealing sleeve towards the rotational sealing sleeve by contacting the sealing sleeve; a seal housing separated by a predetermined distance from the forcing sleeve and the sealing sleeve and supporting the forcing sleeve; and an elastic part mounted between the seal housing and the forcing sleeve and providing a restoring force to the forcing sleeve, wherein the seal housing protrudes in a center direction of the rotation axle and includes a supporting protrusion for supporting one end of the forcing sleeve.

19 Claims, 3 Drawing Sheets

LENGTH DIRECTION

GAS SEAL ASSEMBLY

CROSS-REFERENCE TO RELATED PATENT APPLICATION

This application claims priority from Korean patent application No. 10-2012-0136548, filed on Nov. 28, 2012, in the Korean Intellectual Property Office, the disclosure of which is incorporated herein in its entirety by reference.

BACKGROUND

1. Field

Apparatuses consistent with exemplary embodiments relate to a seal assembly, and more particularly, to a gas seal assembly.

2. Description of the Related Art

In general, a gas seal assembly is used to seal an internal space containing a gas in a device. In particular, a gas seal assembly may be used for various devices, such as compressors, which increase pressure of a gas by reducing a volume thereof. Such a gas seal assembly may include various components.

A gas seal assembly is disclosed in U.S. Pat. No. 6,601,854 (Title of the Invention: Shaft Seal, Applicant: DRESSER-RAND COMPANY). A related art gas seal assembly will now be described in detail with reference to FIG 1.

FIG 1 is a cross-sectional view of a related art gas seal assembly 1.

Referring to FIG 1, the related art gas seal assembly 1 includes an inner sleeve 5 mounted around a rotation axle 6, a rotational sealing sleeve 4 inserted into in the inside of the inner sleeve 5, and a sealing sleeve 2 contacting the rotational sealing sleeve 4. The related art gas seal assembly 1 further includes a forcing sleeve 9 contacting the sealing sleeve 2. The forcing sleeve 9 applies a force to the sealing sleeve 2 by being connected to a separate supporting sleeve 20 via a spring 10. The supporting sleeve 20 is mounted in a seal housing 8.

The related art gas seal assembly 1 configured as described above, includes many components of various types and a driving method thereof is complicated. In particular, the related art gas seal assembly 1 has a large number of parts, and accordingly, manufacturing costs are high and an assembling time is long. Thus, a structure of the related art gas seal assembly needs to be simplified.

SUMMARY

One or more exemplary embodiments provide a gas seal assembly having a simple structure.

According to an aspect of an exemplary embodiment, there is provided a gas seal assembly including: an inner sleeve in which a rotation axle is inserted; a rotational sealing sleeve inserted into an inner sleeve; a sealing sleeve contacting the rotational sealing sleeve; a forcing sleeve forcing the sealing sleeve towards the rotational sealing sleeve by contacting the sealing sleeve; a seal housing separated by a predetermined distance from the forcing sleeve and the sealing sleeve and supporting the forcing sleeve; and an elastic part mounted between the seal housing and the forcing sleeve and providing a restoring force to the forcing sleeve, wherein the seal housing protrudes in a center direction of the rotation axle and includes a supporting protrusion for supporting one end of the forcing sleeve. The forcing sleeve may be configured to apply a force directly to the seal housing without through any intermediate sleeve.

The inner sleeve may include a seating groove into which the rotational sealing sleeve is inserted and seated.

The gas seal assembly may further include a first sealing part disposed at a portion where the inner sleeve and the rotational sealing sleeve contact each other and mounted to be inserted into the inner sleeve.

The first sealing part may block a gas flowing along a portion where the inner sleeve and the rotational sealing sleeve contact each other.

The rotational sealing sleeve and the sealing sleeve may have a surface contact therebetween.

The gas seal assembly may further include a second sealing part disposed between the sealing sleeve and the forcing sleeve to contact the sealing sleeve and the forcing sleeve.

The second sealing part may be mounted by being inserted into at least one of the sealing sleeve and the forcing sleeve.

The gas seal assembly may further include a third sealing part disposed between the forcing sleeve and the seal housing to contact the forcing sleeve and the seal housing.

The third sealing part may be mounted by being inserted into the forcing sleeve or the supporting protrusion.

The third sealing part may be mounted between the supporting protrusion and one end of the forcing sleeve.

The gas seal assembly may further include a position-determining sleeve connected to the inner sleeve and contacting the rotational sealing sleeve.

At least one of the forcing sleeve and the seal housing may include an insertion groove into which a portion of the elastic part is inserted.

According to an aspect of another exemplary embodiment, there is provided a gas seal assembly including: a rotational sealing sleeve inserted into an inner sleeve; a sealing sleeve contacting the rotational sealing sleeve; a forcing sleeve contacting and forcing the sealing sleeve to maintain a contact with the rotational sealing sleeve; a seal housing separated by a predetermined distance from the forcing sleeve and the sealing sleeve and supporting the forcing sleeve; and an elastic part mounted between the seal housing and the forcing sleeve and providing a restoring force to the forcing sleeve, wherein the seal housing protrudes in a rotation axle direction and includes a supporting protrusion for supporting one end of the forcing sleeve.

According to an aspect of still another exemplary embodiment, there is provided a gas seal assembly including: a rotational sealing sleeve inserted into an inner sleeve; a sealing sleeve contacting the rotational sealing sleeve; a forcing sleeve contacting and forcing the sealing sleeve to maintain a contact with the rotational sealing sleeve; a seal housing separated by a predetermined distance from the forcing sleeve and the sealing sleeve, protruding in a rotation axle direction, and supporting one end of the forcing sleeve; an elastic part mounted between the seal housing and the forcing sleeve and providing a restoring force to the forcing sleeve; and a sealing part mounted between the forcing sleeve and the seal housing and between the inner sleeve and the rotational sealing sleeve.

BRIEF DESCRIPTION OF THE DRAWINGS

The above and other aspects will become more apparent by describing in detail exemplary embodiments with reference to the attached drawings, in which.

DETAILED DESCRIPTION

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided to make this disclosure thorough and complete, and will fully convey the inventive concept to one of ordinary skill in the art, and the inventive concept is defined only by the scope of the claims. The terminology used herein is for the purpose of describing particular embodiments only and is not intended to be limiting the embodiments. As used herein, the singular form includes the plural form as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements. Though terms like 'first' and 'second' are used to describe various elements, the elements are not limited to these terms. These terms are used only to differentiate an element from another element.

As used herein, the term "and/or" includes any and all combinations of one or more of the associated listed items. Expressions such as "at least one of," when preceding a list of elements, modify the entire list of elements and do not modify the individual elements of the list.

Figure 1:
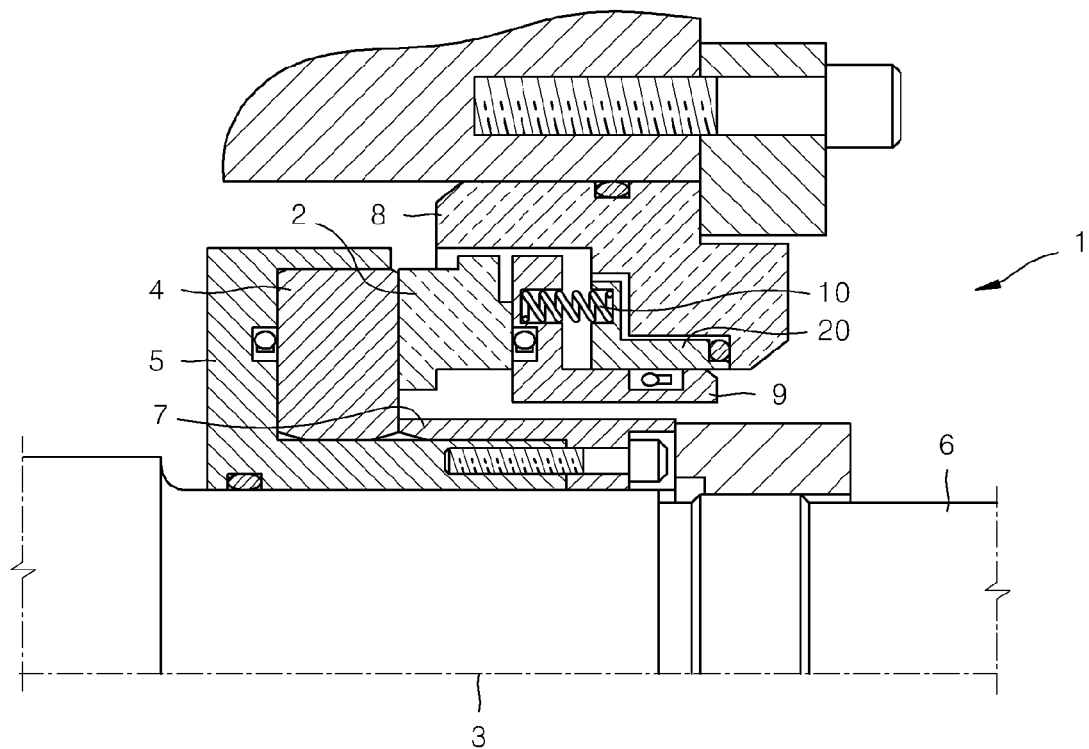
FIG 1 is a cross-sectional view of a related art gas seal assembly.
Figure 2:
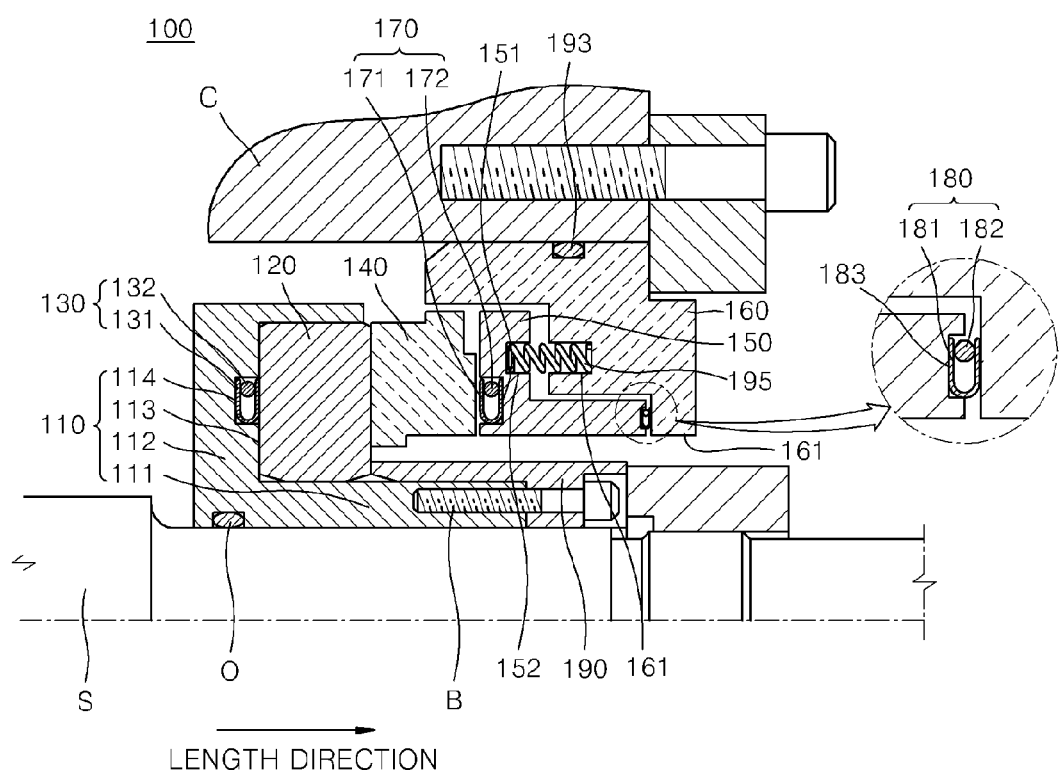
FIG 2 is a cross-sectional view of a gas seal assembly according to an exemplary embodiment.

FIG 2 is a cross-sectional view of a gas seal assembly 100 according to an exemplary embodiment.

Referring to FIG 2, the gas seal assembly 100 may include an inner sleeve 110 into which a rotation axle S is inserted. In this case, the inner sleeve 110 may have an inner space where the rotation axle S is inserted so that an outer circumferential surface of the rotation axle S contacts an inner circumferential surface of the inner sleeve 110.

The inner sleeve 110 may include a first body part 111 having a hollow where the rotation axle S is inserted. The first body part 111 may include a seal ring O which seals the rotation axle S from a gas.

The inner sleeve 110 may include a first coupling part 112 extending from the first body part 111 and protruding in an outer circumferential direction of the rotation axle S. The first coupling part 112 is bent at an end thereof from the first body part 111 and includes a seating groove 113 into which a rotational sealing sleeve 120 is inserted and seated.

In addition, the gas seal assembly 100 may include the rotational sealing sleeve 120 inserted into the inner sleeve 110. The rotational sealing sleeve 120 may have a surface in contact with an inner surface of the seating groove 113. In detail, the rotational sealing sleeve 120 may be fixed by being inserted into and assembled with the seating groove 113.

In addition, the gas seal assembly 100 may include a first sealing part 130 mounted between the rotational sealing sleeve 120 and the inner sleeve 110. The first sealing part 130 may be mounted at a portion where the rotational sealing sleeve 120 and the inner sleeve 110 contact each other.

The first sealing part 130 may be inserted into at least one of the rotational sealing sleeve 120 and the inner sleeve 110. The first sealing part 130 may be inserted into the rotational sealing sleeve 120 or the inner sleeve 110. Alternatively, a portion of the first sealing part 130 may be inserted into each of the rotational sealing sleeve 120 and the inner sleeve 110. Hereinafter, for convenience of description, a case where the first sealing part 130 is inserted into the inner sleeve 110 will be described.

In the case where the first sealing part 130 is inserted into the inner sleeve 110, the inner sleeve 110 may include a first insertion groove 114. In this case, the first insertion groove 114 may be formed inwards from the inner surface of the seating groove 113.

The first sealing part 130 may be formed in various ways. For example, the first sealing part 130 may include an O-ring. Alternatively, the first sealing part 130 may include a U-shaped seal.

Since the O-ring or the U-shaped seal is a general component well known in the art, a detailed description thereof is omitted. Hereinafter, a case where the first sealing part 130 includes a U-shaped seal will be described in detail.

The first sealing part 130 may include a first sealing member 131 having an open side. In addition, the first sealing part 130 may include a first elastic member 132 disposed inside the first sealing member 131. In this case, the first sealing member 131 may be formed of an elastic material that generates a restoring force with respect to the open side. In addition, the first sealing member 131 may be disposed so that the open side of the first sealing member 131 faces a flow direction of a gas.

The first sealing part 130 may block a gas flowing along a portion where the inner sleeve 110 and the rotational sealing sleeve 120 contact each other. In detail, the gas flowing as described above may be stored in the first sealing member 131 by flowing through the open side of the first sealing member 131. In addition, the gas flowing as described above may be secondarily blocked by the first elastic member 132.

In addition, the gas seal assembly 100 may include a sealing sleeve 140 that contacts the rotational sealing sleeve 120. In this case, the sealing sleeve 140 and the rotational sealing sleeve 120 may have contact each other.

In addition, the gas seal assembly 100 may include a forcing sleeve 150 forcing the sealing sleeve 140 toward the rotational sealing sleeve 120 by contacting the sealing sleeve 140. In this case, the forcing sleeve 150 may force the sealing sleeve 140 such that the sealing sleeve 140 does not separate from the forcing sleeve 150.

In addition, the forcing sleeve 150 may be bent. In this case, a bent end of the forcing sleeve 150 may be supported by a seal housing 160 to be described below. Another end of the forcing sleeve 150 may have a surface in contact with the sealing sleeve 140 as described above.

The gas seal assembly 100 may include a second sealing part 170 mounted between the sealing sleeve 140 and the forcing sleeve 150. In this case, the second sealing part 170 may be the same as or similar to the first sealing part 130 described above. Hereinafter, for convenience of description, a case where the second sealing part 170 includes a U-shaped seal will be described in detail.

The second sealing part 170 may include a second sealing member 171 and a second elastic member 172. The second sealing member 171 and the second elastic member 172 are respectively similar to the first sealing member 131 and the first elastic member 132 described above.

The second sealing part 170 may be inserted into at least one of the sealing sleeve 140 and the forcing sleeve 150. In detail, the second sealing part 170 may inserted into the sealing sleeve 140 or the forcing sleeve 150. Alternatively, a portion of the second sealing part 170 may inserted into each of the sealing sleeve 140 and the forcing sleeve 150. Hereinafter, for convenience of description, a case where the second sealing part 170 is inserted into the forcing sleeve 150 will be described in detail.

A second insertion groove 151 may be formed in a portion where the sealing sleeve 140 and the forcing sleeve 150 contact each other so that the second sealing part 170 is inserted into the forcing sleeve 150. In this case, the second insertion groove 151 may be formed at any of various positions. In particular, the second insertion groove 151 may be formed at an optimal position where a force of the forcing sleeve 150 is accurately added to the sealing sleeve 140.

The second sealing part 170 may block a gas flowing along the portion at which the sealing sleeve 140 and the forcing sleeve 150 contact each other. In detail, the second sealing part 170 may be inserted into the forcing sleeve 150 to face the sealing sleeve 140.

The gas seal assembly 100 may include the seal housing 160, which is separated by a predetermined distance from the forcing sleeve 150 and the sealing sleeve 140 and supports the forcing sleeve 150. The seal housing 160 may be mounted not to contact an outer circumferential surface of the forcing sleeve 150 and an outer circumferential surface of the sealing sleeve 140. The seal housing 160 may not contact the forcing sleeve 150 so that the forcing sleeve 150 is movable.

The seal housing 160 may be mounted inside an external case C. The seal housing 160 and the external case C may have contact each other, and a fourth sealing part 193 may be mounted at a portion where the seal housing 160 and the external case C contact each other.

The seal housing 160 may include a supporting protrude 161 protruding in a center direction of the rotation axle S. The supporting protrude 161 may support the end of the forcing sleeve 150 by protruding at one end of the seal housing 160.

The gas seal assembly 100 may include a third sealing part 180 disposed between the forcing sleeve 150 and the seal housing 160. The third sealing part 180 may be the same as or similar to the first sealing part 130 described above. Hereinafter, for convenience of description, a case where the third sealing part 180 includes a U-shaped seal will be described.

The third sealing part 180 may include a third sealing member 181 and a third elastic member 182. The third sealing member 181 and the third elastic member 182 are respectively the same as the first sealing member 131 and the first elastic member 132 described above.

The third sealing part 180 may be inserted into the forcing sleeve 150 or the seal housing 160. Hereinafter, for convenience of description, a case where the third sealing part 180 is mounted into the forcing sleeve 150 will now be described in detail.

When the third sealing part 180 is mounted on the forcing sleeve 150, a third insertion groove 183 may be formed in an outer surface of the forcing sleeve 150 so that the third sealing part 180 is inserted into the forcing sleeve 150.

The third sealing part 180 mounted as described above may block a gas flowing along a portion where the forcing sleeve 150 and the seal housing 160 face each other. The third sealing part 180 may block a flowing gas as described above by blocking a space between the forcing sleeve 150 and the seal housing 160.

The gas seal assembly 100 may include a position-determining sleeve 190 which is mounted to connect to the inner sleeve 110 and contacts the rotational sealing sleeve 120. The position-determining sleeve 190 may have a hollow therein through which the rotation axle S is inserted. The position-determining sleeve 190 may be connected to the inner sleeve 110 by a coupling member B such as a bolt or the like.

The gas seal assembly 100 may include an elastic part 195 mounted between the seal housing 160 and the forcing sleeve 150 to provide a restoring force to the forcing sleeve 150. The elastic part 195 may be formed in various ways. For example, the elastic part 195 may be formed of a rubber material. Alternatively, the elastic part 195 may include a spring.

An elastic part insertion groove 152 and/or 161 into which the elastic part 195 is inserted may be formed in at least one of the forcing sleeve 150 and the seal housing 160. The elastic part insertion groove 152 or 161 may be formed in the forcing sleeve 150 or the seal housing 160, or the elastic part insertion grooves 152 and 161 may be formed in the forcing sleeve 150 and the seal housing 160, respectively.

When the elastic part insertion grooves 152 and 161 are respectively formed in the forcing sleeve 150 and the seal housing 160, and the elastic part 195 is inserted into the elastic part insertion grooves 152 and 161, the elastic part 195 can be prevented from escaping from its position when pressed.

A method of operating the gas seal assembly 100 and sealing a gas will now be described.

Figure 3:
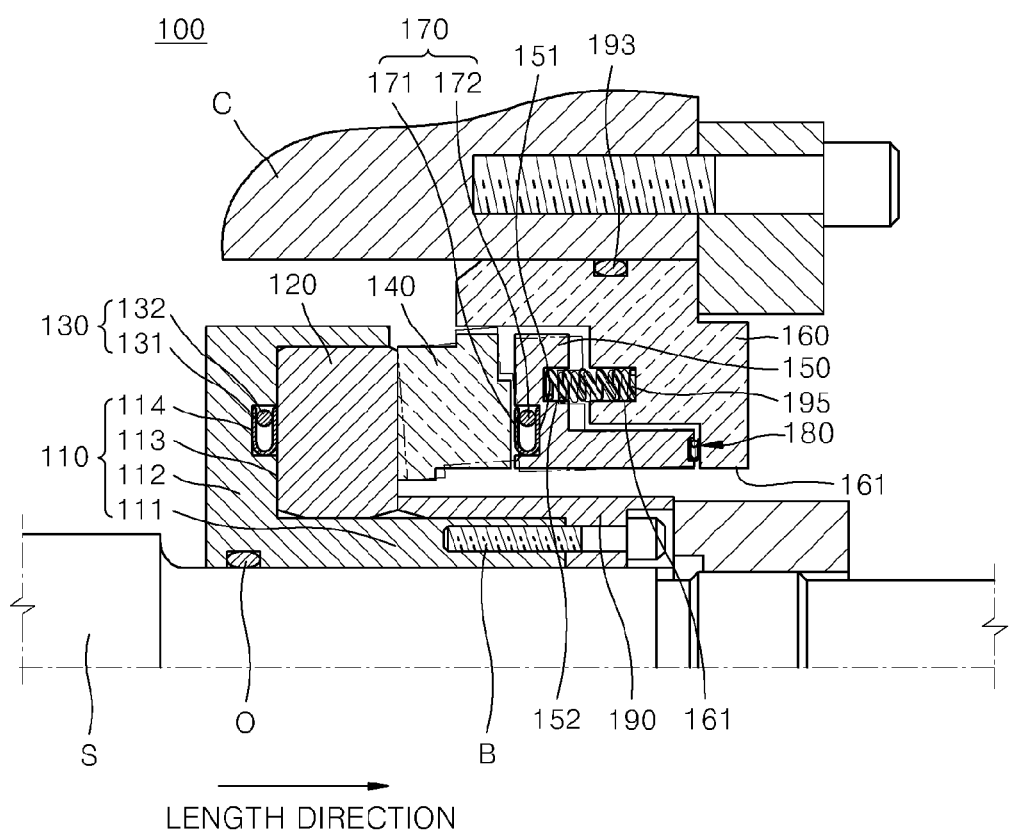
FIG 3 is a cross-sectional view of the gas seal assembly of FIG 2 to describe an operation of the gas seal assembly, according to an exemplary embodiment.

FIG 3 is a cross-sectional view of the gas seal assembly 100 of FIG 2 to describe an operation thereof, according to an exemplary embodiment.

Referring to FIG 3, the gas seal assembly 100 may be mounted around the rotation axle S. For example, the gas seal assembly 100 may be mounted in a device, such as a compressor, for compressing a gas and supplying the compressed gas to the outside. Hereinafter, for convenience of description, a case where the gas seal assembly 100 is used in a compressor will now be described.

To increase the compressor's efficiency, a gas flowing along the rotation axle S needs to be blocked when the rotation axle S rotates. Thus, the gas seal assembly 100 can prevent the flowing gas from moving along a length direction of the rotation axle S.

When the rotation axle S rotates, a gas from the outside may flow into the inside of the compressor through an impeller (not shown). At this time, the gas flowing into the inside of the compressor may flow along the length direction of the rotation axle S.

The gas may flow between the external case C and the inner sleeve 110. In this case, the gas may flow along a space between the inner sleeve 110 and the rotational sealing sleeve 120.

In addition, the gas may flow along a space between the rotational sealing sleeve 120 and the sealing sleeve 140, along a space between the forcing sleeve 150 and the sealing sleeve 140, and along a space between the forcing sleeve 150 and the seal housing 160.

The gas flowing along the space between the inner sleeve 110 and the rotational sealing sleeve 120 may be blocked by the first sealing part 130 as described above. In addition, since a buoyancy force is generated between the rotational sealing sleeve 120 and the sealing sleeve 140 by the gas flowing through the compressor, when the rotational sealing sleeve 120 rotates, the sealing sleeve 140 may stop. In this case, a surface of the rotational sealing sleeve 120 facing the sealing sleeve 140 may be formed to be uneven to block a portion of the gas flowing between the rotational sealing sleeve 120 and the sealing sleeve 140.

The gas flowing along the space between the forcing sleeve 150 and the sealing sleeve 140 may be blocked by the second sealing part 170. In particular, the gas flowing along the space between the forcing sleeve 150 and the sealing sleeve 140 may be blocked by the second sealing member 171. In addition, the gas flowing along the space between the forcing sleeve 150 and the seal housing 160 may be blocked by the third sealing part 180. In particular, the gas flowing along the space between the forcing sleeve 150 and the seal housing 160 may be blocked by the third sealing member 181.

A pressure of the gas in the inner sleeve 110 may be higher than a pressure of the gas in the seal housing 160. In addition, a pressure of the gas may gradually decrease from the inner sleeve 110 toward the seal housing 160.

Thus, a gas flow may occur due to a pressure difference as described above. In this case, the gas flow may remove a lubricant supplied onto the rotation axle S. When the lubricant is removed, wear of the rotation axle S may increase, thereby resulting in a decrease in the life span of the rotation axle S.

To prevent the problem described above, inflow of the gas may be blocked by the first, second, and third sealing parts 130, 170, and 180.

However, since no sealing part is separately mounted in the space between the rotational sealing sleeve 120 and the sealing sleeve 140, the life span of the rotation axle S is greatly influenced by how well the contact surface between the rotational sealing sleeve 120 and the sealing sleeve 140 is maintained.

In detail, the rotational sealing sleeve 120 and the sealing sleeve 140 may have a contact surface therebetween as described above. However, the rotational sealing sleeve 120 and the sealing sleeve 140 may have no contact surface therebetween and may be separated from each other due to a mounting tolerance and/or a rotation of the rotation axle S.

In particular, the rotational sealing sleeve 120 and the sealing sleeve 140 may be separated from each other due to an influence, such as resonance or the like, according to the rotation of the rotation axle S. In this case, the sealing sleeve 140 may move such that one end of the sealing sleeve 140 is away from one end of the rotational sealing sleeve 120 where the one end of the sealing sleeve 140 contacts. When the sealing sleeve 140 is away from the rotational sealing sleeve 120 in this manner, the sealing sleeve 140 may move toward the forcing sleeve 150.

When the sealing sleeve 140 moves as described above, the forcing sleeve 150 may move toward the seal housing 160 and then add a force to the elastic part 195. According to the movement of the forcing sleeve 150, the elastic part 195 may store a restoring force by being compressed and provide the restoring force to the forcing sleeve 150. In particular, the elastic part 195 may be inserted into the elastic part insertion groove 152 and/or 161 and compressed to thereby prevent the elastic part 195 from distorting or escaping from the elastic part insertion groove 152 and/or 161 due to the movement of the forcing sleeve 150.

When the restoring force is provided by the elastic part 195, the forcing sleeve 150 may add a force to the sealing sleeve 140. In particular, the forcing sleeve 150 may force the rotational sealing sleeve 120 such that the sealing sleeve 140 has a surface in contact with the rotational sealing sleeve 120.

As described above, the sealing sleeve 140 may maintain a contact surface with the rotational sealing sleeve 120 due to the forcing sleeve 150 forcing the rotational sealing sleeve 120.

As described above, the gas seal assembly 100 has a simple structure and can effectively block a flow of a gas which occurs due to rotation of the rotation axle S. Furthermore, the gas seal assembly 100 can have a reduced number of parts compared to the related art gas seal assembly, and thus, the manufacturing costs are reduced, assembling process is simple, and the assembling time is short.

In addition, by using a leverage effect for a degree of freedom which a linkage mechanism required to effectively block a gas should have, a structure can be simplified.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A gas seal assembly comprising:
an inner sleeve in which a rotation axle is inserted;
a rotational sealing sleeve inserted into the inner sleeve;
a sealing sleeve contacting the rotational sealing sleeve;
a forcing sleeve forcing the sealing sleeve toward the rotational sealing sleeve by contacting the sealing sleeve;
a seal housing separated by a predetermined distance from the forcing sleeve and the sealing sleeve and supporting the forcing sleeve, wherein the seal housing does not extend to a space formed by an inner circumferential surface of the forcing sleeve opposite to an outer circumferential surface of the rotation axle; and
an elastic part mounted between the seal housing and the forcing sleeve and providing a restoring force to the forcing sleeve,
wherein the seal housing protrudes in a center direction of the rotation axle and comprises a supporting protrusion for supporting one end of the forcing sleeve.

2. The gas seal assembly of claim 1, wherein the inner sleeve comprises a seating groove into which the rotational sealing sleeve is inserted and seated.

3. The gas seal assembly of claim 1, further comprising a first sealing part disposed at a portion where the inner sleeve and the rotational sealing sleeve contact each other and inserted into the inner sleeve.

4. The gas seal assembly of claim 3, wherein the first sealing part blocks a gas flowing along a portion where the inner sleeve and the rotational sealing sleeve contact each other.

5. The gas seal assembly of claim 1, wherein the rotational sealing sleeve and the sealing sleeve contact each other.

6. The gas seal assembly of claim 1, further comprising a second sealing part disposed between the sealing sleeve and the forcing sleeve and contacting the sealing sleeve and the forcing sleeve.

7. The gas seal assembly of claim 6, wherein the second sealing part is inserted into at least one of the sealing sleeve and the forcing sleeve.

8. The gas seal assembly of claim 1, further comprising a third sealing part disposed between the forcing sleeve and the seal housing and contacting the forcing sleeve and the seal housing.

9. The gas seal assembly of claim 8, wherein the forcing sleeve is configured to apply a force directly to the seal housing through the elastic part, and wherein no intermediate sleeve is disposed between the forcing sleeve and the seal housing.

10. The gas seal assembly of claim 8, wherein the third sealing part is inserted into the forcing sleeve or the supporting protrusion.

11. The gas seal assembly of claim 8, wherein the third sealing part is mounted between the supporting protrusion and one end of the forcing sleeve.

12. The gas seal assembly of claim 1, further comprising a position-determining sleeve connected to the inner sleeve and contacting the rotational sealing sleeve.

13. The gas seal assembly of claim 1, wherein at least one of the forcing sleeve and the seal housing comprises an insertion groove into which a portion of the elastic part is inserted.

14. The gas assembly of claim 1, wherein the forcing sleeve is configured to apply a force directly to the seal housing without through any intermediate sleeve.

15. The gas seal assembly of claim 1, wherein a surface of the sealing sleeve facing the forcing sleeve consists of a first surface and a second surface, and the first surface is in contact with a surface of the forcing sleeve facing the sealing sleeve and the second surface is not in contact with the surface of the forcing sleeve facing the sealing sleeve.

16. A gas seal assembly comprising:
a rotational sealing sleeve inserted into an inner sleeve;
a sealing sleeve contacting the rotational sealing sleeve;
a forcing sleeve contacting and forcing the sealing sleeve to maintain a contact with the rotational sealing sleeve;
a seal housing separated by a predetermined distance from the forcing sleeve and the sealing sleeve and supporting the forcing sleeve, wherein the seal housing does not extend to a space formed by an inner circumferential surface of the forcing sleeve opposite to an outer circumferential surface of the rotation axle; and
an elastic part mounted between the seal housing and the forcing sleeve and providing a restoring force to the forcing sleeve,
wherein the seal housing protrudes in a rotation axle direction and includes a supporting protrusion for supporting one end of the forcing sleeve.

17. The gas assembly of claim 16, wherein the forcing sleeve is configured to apply a force directly to the seal housing without through any intermediate sleeve.

18. The gas assembly of claim 17, wherein the forcing sleeve is configured to apply a force directly to the seal housing without through any intermediate sleeve.

19. A gas seal assembly comprising:
a rotational sealing sleeve inserted into an inner sleeve;
a sealing sleeve contacting the rotational sealing sleeve;
a forcing sleeve contacting and forcing the sealing sleeve to maintain a contact with the rotational sealing sleeve;
a seal housing separated by a predetermined distance from the forcing sleeve and the sealing sleeve, protruding in a rotation axle direction, and supporting one end of the forcing sleeve, wherein the seal housing does not extend to a surface formed by an inner circumferential surface of the forcing sleeve opposite to an outer circumferential surface of the rotation axle;
an elastic part mounted between the seal housing and the forcing sleeve and providing a restoring force to the forcing sleeve; and
a sealing part mounted between the forcing sleeve and the seal housing and between the inner sleeve and the rotational sealing sleeve.

* * * * *